United States Patent
Kang et al.

(10) Patent No.: US 8,688,739 B2
(45) Date of Patent: Apr. 1, 2014

(54) SYSTEM AND METHOD FOR DATA MATCHING

(75) Inventors: Kyu Chang Kang, Daejeon (KR); Chang Seok Bae, Daejeon (KR); Seong Uk Heo, Ulsan (KR); Dong Won Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/557,464

(22) Filed: Jul. 25, 2012

(65) Prior Publication Data
US 2013/0031119 A1 Jan. 31, 2013

(30) Foreign Application Priority Data
Jul. 29, 2011 (KR) .......................... 10-2011-0076220

(51) Int. Cl.
*G06F 17/30* (2006.01)
(52) U.S. Cl.
USPC ........... 707/791; 707/802; 707/814; 707/822; 707/828
(58) Field of Classification Search
USPC .................................................. 707/600–899
See application file for complete search history.

(56) References Cited

U.S. PATENT DOCUMENTS

2009/0299566 A1* 12/2009 Tanigawa et al. ............... 701/33

FOREIGN PATENT DOCUMENTS

| KR | 2003-0015061 | 2/2003 |
| KR | 10-2009-0112349 | 10/2009 |
| KR | 10-2010-0063965 | 6/2010 |

* cited by examiner

*Primary Examiner* — Isaac M Woo
(74) *Attorney, Agent, or Firm* — Staas & Halsey LLP

(57) ABSTRACT

A system and method for data matching are disclosed. A user terminal included in the system includes a data provider, a data consumer, and a mapper. The data provider receives life log data of a user which is collected by at least one life log collecting apparatus. The data consumer receives the life log data from the data provider, and compares the life log data and reference data received from a service server to determine whether a difference between the life log data and the reference data exceeds a predetermined threshold value. The mapper maps the service server which provides the reference data corresponding to information of the life log data received from the data provider. Accordingly, the usability to of life log apparatuses can increase.

8 Claims, 3 Drawing Sheets

SYSTEM AND METHOD FOR DATA MATCHING

CLAIM FOR PRIORITY

This application claims priority to Korean Patent Application No. 10-2011-0076220 filed on Jul. 29, 2011 in the Korean Intellectual Property Office (KIPO), the entire contents of which are hereby incorporated by reference.

BACKGROUND

1. Technical Field

Example embodiments of the present invention relate in general to a system and method for data matching, and more specifically, to a system and method for data matching between a life log collecting apparatus and an application program.

2. Related Art

A life log contains all information associated with acts conducted in a user's daily life. The concept of life log service refers to technology and service for keeping useful information while surfing the Web, and like a blog, a term created by combining "Web" and "log", for recording daily life.

The term "life log" originated from the life log project of the defense advanced research projects agency (DARPA), a research institute of the U.S. State Department. This project, dating back to 2003, records all agents' acts related to information activities for coping with global tenor. In 2003, the DARPA of the Pentagon tried to develop life log technology for enhancing the efficiency of military training. In 2005, the Microsoft Corporation launched the MyLifeBits project for recording, storing, managing, and searching information on sights, sounds and movements of an individual in daily life, by using a dedicated apparatus called a SenseCam.

MyLifeBits is for digitalizing all information on daily life, and builds a digital database of all audiovisual information that an individual sees and hears throughout the day (including emails, websites, books, and documents that the individual views). Then, MyLifeBits enables users to easily search the database by using a search engine. Therefore, users can easily find information on the past and previously met people that the users cannot remember.

In Japan, the research laboratory of Tokyo University conducted research into collecting user information by using cameras, microphones, GPS, gyro sensors, and accelerometer sensors, storing and managing the collected information in a notebook computer, and searching the stored information. Nokia developed life blog software that manages history information of an individual based on various forms of multimedia information such as messages, images, video, and audio information that are stored in a portable phone.

However, in such conventional life log services, a life log collecting apparatus that collects user information is developed by a plurality of different companies, and thus is required to use a dedicated application program that is provided from each of the companies.

SUMMARY

Accordingly, example embodiments of the present invention are provided to substantially obviate one or more problems due to limitations and disadvantages of the related art.

Example embodiments of the present invention provide a system and method for data matching.

Example embodiments of the present invention also provide a data matching method between a life log collecting apparatus and an application program, and a system for the same.

In some example embodiments, a user terminal includes: a data provider configured to receive life log data of a user which is collected by at least one life log collecting apparatus; a data consumer configured to receive the life log data from the data provider, and compare the life log data and reference data received from a service server to determine whether a difference between the life log data and the reference data exceeds a predetermined threshold value; and a mapper configured to map the service server which provides the reference data corresponding to information of the life log data received from the data provider.

In other example embodiments, a data matching method, performed by a user terminal, includes: receiving life log data of a user which is collected by at least one life log collecting apparatus; searching a service server which provides reference data corresponding to the life log data, and receiving the reference data from the searched service server; and determining whether a difference between the life log data and the reference data exceeds a predetermined threshold value.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
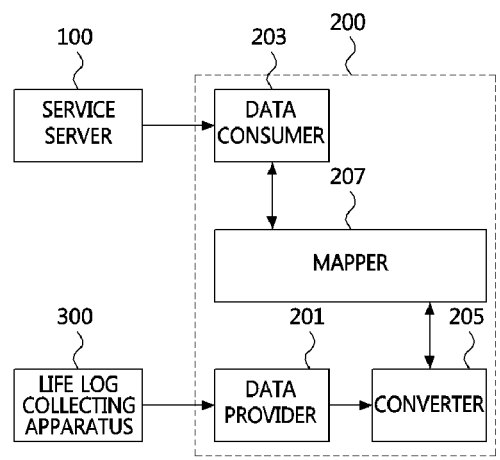
FIG. 1 is a block diagram schematically illustrating an internal structure of a data matching system according to an embodiment of the present invention.

The invention may have diverse modified embodiments, and thus, example embodiments are illustrated in the drawings and are described in the detailed description of the invention. However, this does not limit the invention within specific embodiments and it should be understood that the invention covers all the modifications, equivalents, and replacements within the idea and technical scope of the invention. Like numbers refer to like elements throughout the description of the figures.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present invention will be described in detail with reference to the accompanying drawings.

FIG. 1 is a block diagram schematically illustrating an internal structure of a data matching system according to an embodiment of the present invention.

Referring to FIG. 1, the data matching apparatus includes a service server 100, a user terminal 200, and a life log collecting apparatus 300.

The life log collecting apparatus 300 may be manufactured in different types by a plurality of manufacturers, and collect life log data associated with the conduction of a user's daily life. For example, the life log collecting apparatus 300 may take a user's pulse and temperature. The life log collecting apparatus 300 may include at least one sensor (not shown), which may include at least one of a heat flow sensor, a dermatherm, an illuminometer, a hygrometer, an ultraviolet (UV) sensor, and a gyro sensor.

The service server 100 is a server that provides reference data to the user terminal 200. Here, the reference data is data that is compared with life log data received from the data provider 201 by the below-described data consumer 203. For example, the reference data may include a pulse and a body temperature that a user needs to maintain as instructed by a doctor.

The user terminal 200 may include the data provider 201, the data consumer 203, a converter 205, and a mapper 207, and may be configured in various types. For example, a terminal that is described in the specification may use a mobile terminal such as a portable phone, a smart phone, a notebook computer, a digital broadcasting terminal, a personal digital assistant (PDA), a portable multimedia player (PMP), or a navigation system, or a fixed terminal such as a digital television (TV) or a desktop computer. In the following description, the terminal is assumed as being a mobile terminal. However, it is obvious to those skilled in the art that the below-described configuration may be applied even to the fixed terminal, except for any elements configured especially for the mobile terminal. The data provider 201 may receive the life log data of users from a plurality of life log collecting apparatuses that have been respectively developed by a plurality of different manufacturers, and provide the life log data to the data consumer 203 according to control by the mapper 207. In FIG. 1, one data provider 201 is illustrated in the user terminal 200, but a plurality of data providers 201 may be provided according to the number of life log collecting apparatuses 300. Therefore, the internal structure of FIG. 1 may be modified.

The data consumer 203 receives life log data from the data provider 201 according to control by the mapper 207. Also, the data consumer 203 receives the reference data from the service server 100, and compares the received reference data with the life log data received from the data provider 201. When the life log data is more than the reference data, the data consumer 203 informs a user of the comparison result.

The converter 205 may convert the life log data provided from the data provider 201, and transmit the converted data to the data consumer 203.

The mapper 207 maps information of the life log data, provided from the data provider 201, and the service server 100 that will provide reference data corresponding to the information. To this end, an operation in which the mapper 207 performs mapping will be described in more detail with reference to FIG. 5.

Figure 2:
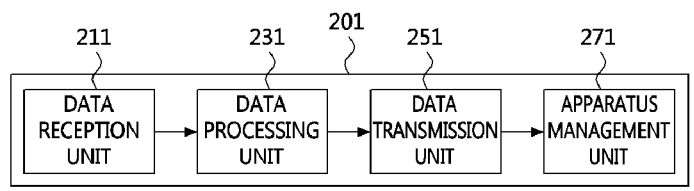
FIG. 2 is a block diagram schematically illustrating an internal structure of a data provider of a user terminal of the data matching system according to an embodiment of the present invention.

FIG. 2 is a block diagram schematically illustrating an internal structure of a data provider of a user terminal of the data matching system according to an embodiment of the present invention.

Referring to FIG. 2, the data provider 201 of the user terminal 200 of the data matching system may include a data reception unit 211, a data processing unit 231, a data transmission unit 251, and an apparatus management unit 271.

The data reception unit 211 may receive data from a plurality of life log collecting apparatuses that have been respectively developed by a plurality of different manufacturers. The data processing unit 231 may process data received by the data reception unit 211. The data transmission unit 251 may establish a data channel for transmitting the data processed by the data processing unit 231 to the data consumer 203. The apparatus management unit 271 may establish a control channel that is used for communicating with the mapper 207, for performing an interaction on the user terminal 200.

Figure 3:
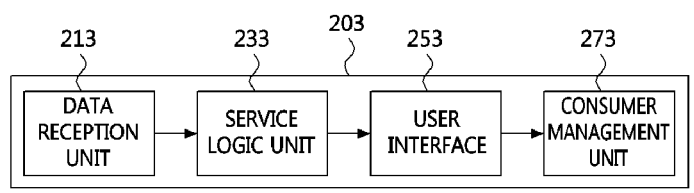
FIG. 3 is a block diagram schematically illustrating an internal structure of a data consumer of the user terminal of the data matching system according to an embodiment of the present invention.

FIG. 3 is a block diagram schematically illustrating an internal structure of a data consumer of the user terminal of the data matching system according to an embodiment of the present invention.

Referring to FIG. 3, the data consumer 203 of the user terminal 200 of the data matching system may include a data reception unit 213, a service logic unit 233, a user interface 253, and a consumer management unit 273.

The data reception unit 213 may receive data provided from the data provider 201 according to the mapping performed by the mapper 207. The service logic unit 233 may process data received from the data reception unit 213 to provide a service. The user interface 253 may provide the service to a user. The consumer management unit 273 may establish a control channel that is used for communicating with the mapper 207, for performing an interaction on the user terminal 200.

Figure 4:
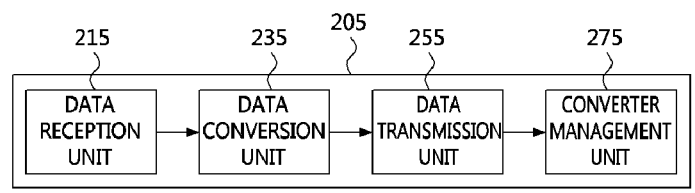
FIG. 4 is a block diagram schematically illustrating an internal structure of a converter of the user terminal of the data matching system according to an embodiment of the present invention.

FIG. 4 is a block diagram schematically illustrating an internal structure of a converter of the user terminal of the data matching system according to an embodiment of the present invention.

Referring to FIG. 4, the converter 205 of the user terminal 200 of the data matching system may include a data reception unit 215, a data conversion unit 235, a data transmission unit 255, and a converter management unit 275. The data reception unit 215 may receive data from the data provider 201. The data conversion unit 235 may convert data received by the data reception unit 215. The data transmission unit 255 may establish a data channel for transmitting the converted data to the data consumer 203. The converter management unit 275 may establish a control channel that is used for communicating with the mapper 207, for performing an interaction on the user terminal 200.

Figure 5:
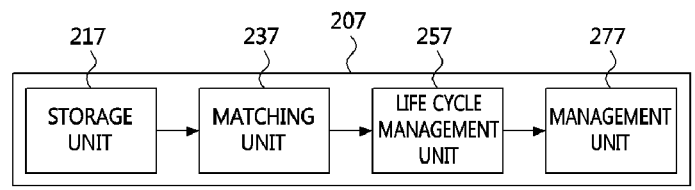
FIG. 5 is a block diagram schematically illustrating an internal structure of a mapper of the user terminal of the data matching system according to an embodiment of the present invention.

FIG. 5 is a block diagram schematically illustrating an internal structure of a mapper of the user terminal of the data matching system according to an embodiment of the present invention.

Referring to FIG. 5, the mapper 207 of the user terminal 200 of the data matching system may include a storage unit 217, a matching unit 237, a life cycle management unit 257, and a management unit 277.

The storage unit 217 may store information of life log data provided from the data provider 201 to the data consumer 203, and store information of life log data that the data consumer 203 requires. Also, the storage unit 217 may store metadata on life log data, and the metadata may include the kind of a life log and information on a service server corresponding to the kind of the life log.

The storage unit 217 may include at least one type of storage medium selected from among a flash memory type of memory, a multimedia card micro type of memory, a hard disk type of memory, a card type of memory (for example, SD or XD), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The matching unit 237 may map a service server that will provide reference data corresponding to the information of life log data provided from the data provider 201, on the basis of the metadata on the life log data stored in the storage unit 217.

The life cycle management unit 257 may manage the life cycle of the data provider 201 that provides specific data when the data consumer 203 requires the specific data. The management unit 277 may communicate with the data provider 201, the converter 205, and the data consumer 203.

Figure 6:
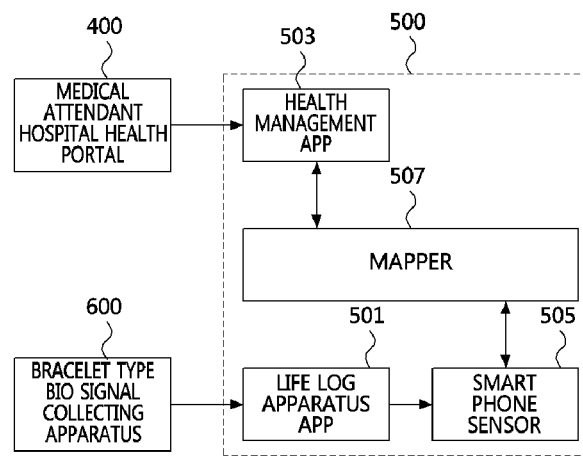
FIG. 6 is an exemplary diagram illustrating a case in which the data matching system according to an embodiment of the present invention is used in a smart phone for managing a user's health.

FIG. 6 is an exemplary diagram illustrating a case in which the data matching system according to an embodiment of the present invention is used in a smart phone for managing a user's health. In the embodiment of FIG. 6, the life log collecting apparatus 300 is illustrated as a bracelet type bio signal collecting apparatus 600, and the service server 100 is illustrated as a hospital health portal 400 for a user's medical attendant. However, the present embodiment is not limited thereto.

The medical attendant hospital health portal 400 may include health management information and hospital diagnosis history information of the user, prescription instruction information of a doctor, etc. The medical attendant hospital health portal 400 may provide necessary information to a health management app(application) 503 according to a request of a service program such as the health management app 503.

The bracelet type bio signal collecting apparatus 600 is worn on a user's wrist. When the user exercises, a sensor (not shown) included in the bracelet type bio signal collecting apparatus 600 may collect the pulse and skin temperature of the user and provide the collected information to a life log apparatus app 501. Here, the sensor may include at least one of a heat flow sensor, a dermatherm, a tonometer, an illuminometer, a hygrometer, a UV sensor, an external thermometer, and a gyro sensor.

In the embodiment of FIG. 6, the data provider 201 of a user portable terminal 500 is illustrated as the life log apparatus app 501, the converter 205 of the user portable terminal 500 is illustrated as a smart phone sensor 505, and the data consumer 203 is illustrated as the health management app 503.

The life log apparatus app 501 may provide the pulse and skin temperature of a user, received from the bracelet type bio signal collecting apparatus 600, to the health management app 503 according to mapping performed by a mapper 507.

The health management app 503 interfaces directly with the user. The health management app 503 may collect the pulse and skin temperature of the user from the life log apparatus app 501 according to the mapping performed by the mapper 507, and receive the exercise information of the user collected by the smart phone sensor 505 in real time. The health management app 503 may compare reference data received by the medical attendant hospital health portal 400 and data received from the life log apparatus app 501 and the smart phone sensor 505.

When the reference data received by the medical attendant hospital health portal 400 exceeds the received data due to excessive exercise of the user, the health management app 503 may advise the user. When the user is incapacitated, the health management app 503 may provide a service in which the health management app 503 access a hospital site to allow the hospital to provide care for the user.

The smart phone sensor 505 may include an accelerometer sensor and a position measurement sensor. The present invention may acquire a variety of daily log information through various sensors such as the above-described sensors. The smart phone sensor 505 may act as a converter that continuously measures an acceleration sensing value, converts the measured acceleration sensing value into the amount of exercise, and provides the converted data to another app.

The mapper 507 may manage the life log apparatus app 501, the health management app 503, and the smart phone sensor 505 so as to perform an interaction therebetween. The mapper 507 registers or unregisters information corresponding to data provided from the life log apparatus app 501 to the health management app 503, and registers or unregisters information corresponding to data that the health management app 503 requires. The mapper 507 may match the life log apparatus app 501 and the health management app 503 on the basis of the registered/unregistered information. First, the mapper 507 searches the life log apparatus app 501 providing data that the health management app 503 requires, on the basis of the information corresponding to data provided from the life log apparatus app 501, and provides the search result to the health management app 503.

Figure 7:
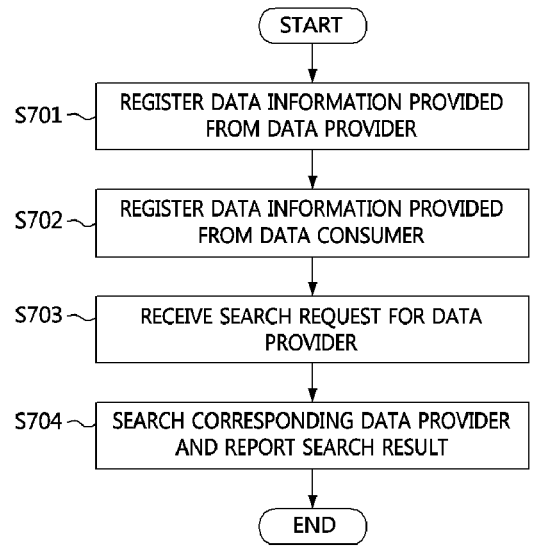
FIG. 7 is a flowchart for describing an operation of a data matching method according to an embodiment of the present invention.

FIG. 7 is a flowchart for describing an operation of a data matching method according to an embodiment of the present invention.

Referring to FIG. 7, the data provider receives data, which are provided from a plurality of life log collecting apparatuses that have been respectively developed by a plurality of different manufacturers, to provide information of the data to the data consumer, and the user terminal 200 receives and registers the information corresponding to data in operation S701. Also, the user terminal 200 receives and registers information corresponding to data that the data consumer requires in operation S702. Subsequently, the user terminal 200 receives a request to search the data provider that provides data that the data consumer requires, from the data consumer in operation S703. The user terminal 200 searches the data provider that provides the requested data, and informs the data consumer of the search result in operation S704.

Figure 8:
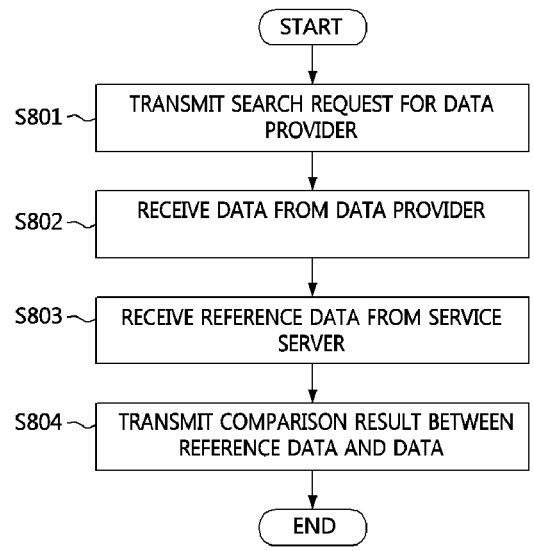
FIG. 8 is a flowchart for describing an operation in which the data consumer of the user terminal of the data matching system according to an embodiment of the present invention informs a user of data-related information by using data received from the data provider.

FIG. 8 is a flowchart for describing an operation in which the data consumer of the user terminal of the data matching system according to an embodiment of the present invention informs a user of data-related information by using data received from the data provider.

Referring to FIG. 8, the data consumer transmits a search request for searching a data provider that provides required data among a plurality of data providers in operation S801. The data consumer receives information of the data provider providing data that the data consumer requires, according to the search request from the data provider, and receives data from the data provider corresponding to the received information in operation S802. The data consumer receives reference data from the service server in operation S803. The data consumer compares the reference data and the data received from the data provider, and when the data is more than the reference data, the data consumer provides the comparison result to the user in operation S804.

According to the embodiments of the present invention, by using the method and system for data matching, a plurality of life log collecting apparatuses that have been respectively manufactured by different manufacturers can be applied to a program (which has been created by a different manufacturer) as well as the dedicated application program of a corresponding manufacturer, and thus, the usability of the life log collecting apparatuses can increase.

Moreover, by using the method and system for data matching according to the embodiments of the present invention, a service application program development company can combine and use a plurality of life log collecting apparatuses that have been respectively manufactured by different companies, and thus, service application programs having better quality can be provided.

While the example embodiments of the present invention and their advantages have been described in detail, it should be understood that various changes, substitutions and alterations may be made herein without departing from the scope of the invention.

What is claimed is:

1. A user terminal comprising:
    a data provider configured to receive life log data of a user which is collected by at least one life log collecting apparatus;
    a data consumer configured to receive the life log data from the data provider, and compare the life log data and reference data received from a service server to determine whether a difference between the life log data and the reference data exceeds a predetermined threshold value; and
    a mapper configured to map the service server which provides the reference data corresponding to information of the life log data received from the data provider.

2. The user terminal of claim 1, wherein,
    the mapper comprises metadata on life log data, and maps the life log data and the service server by using the metadata, and
    the metadata comprises a kind of a life log and information on a service server corresponding to the kind of the life log.

3. The user terminal of claim 1, wherein the data provider receives life log data which is information associated with acts conducted in the user's daily life and collected by a sensor of the life log collecting apparatus.

4. The user terminal of claim 3, wherein the information associated with acts conducted in the user's daily life comprises at least one of heat flow information, skin temperature information, blood pressure information, illumination information, UV information, and external temperature information.

5. A data matching method performed by a user terminal, the data matching method comprising:
    receiving life log data of a user which is collected by at least one life log collecting apparatus;
    searching a service server which provides reference data corresponding to the life log data, and receiving the reference data from the searched service server; and
    determining whether a difference between the life log data and the reference data exceeds a predetermined threshold value.

6. The data matching method of claim 5,
    wherein the searching of a service server comprises searching the service server by using metadata on the life log data, the metadata comprising a kind of a life log and information on a service server corresponding to the kind of the life log.

7. The data matching method of claim 5, wherein the receiving of life log data comprises receiving the life log data which is information associated with acts conducted in the user's daily life and collected by a sensor of the life log collecting apparatus.

8. The data matching method of claim 7, wherein the information associated with acts conducted in the user's daily life comprises at least one of heat flow information, skin temperature information, blood pressure information, illumination information, UV information, and external temperature information.

* * * * *